July 30, 1929.    H. L. TANNER    1,722,948

ANTIFRICTION BEARING

Filed July 23, 1924

INVENTOR.
Harry L. Tanner,
BY Moakley and Gill
ATTORNEYS.

Patented July 30, 1929.

1,722,948

UNITED STATES PATENT OFFICE.

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK.

ANTIFRICTION BEARING.

Application filed July 23, 1924. Serial No. 727,821.

This invention relates to anti-friction bearings and is particularly directed toward bearings of this character of which superlative sensitiveness is one of the prerequisites. The need for such bearings frequently occurs and resort is had, in some instances, to knife-edge bearings. That the knife-edge shall rock about a definite axis, a seat is provided for it, which usually is in the nature of a depression, an obtuse angle V-cut in a piece of metal furnishing a vertex suited for the reception of the knife-edge of acute angle cross section.

Without appropriate finishing of the metal at the vertices of the knife-edge and its seat, there is some lack of responsiveness on the part of the knife-edge to impulses tending to rock it. Therefore, the co-acting surfaces of the knife-edge and its seat are accurately ground to size, polished and given minute radii at the vertices of the knife-edge and its seat, whereby, for many purposes, an efficient bearing is obtained.

While in this type of bearing, with its V-shaped knife fitting into the V-shaped seat therefor, there is a definite positioning of the knife-edge, there is also a less degree of freedom in the bearing than is desirable in many instances. Accordingly, the seat for the knife-edge has in some such cases been made in substantially semi-circular form with a radius many times the length of the minute radius given the edge of the knife. This results in the bearing having the desirable freedom, but a lack of definiteness in the position of the knife-edge, since the latter can shift an undue amount on its arcuate seat of relatively large radius.

It is contemplated to employ the present invention to retain the advantages of both of the referred to forms of bearings, and at the same time be free from their disadvantages. My novel form of bearing is especially suitable where still greater freedom of the bearing is desirable, and while this may occur in devices of widely separated character, gyroscopic apparatus is a good example of a field wherein the sensitive bearing of this invention may be used to advantage. As is well-known to those skilled in the art, torque developed about one axis of freedom of a gyroscope will cause precession of the gyroscope about another axis perpendicular to the stressed axis, and, if there is any tendency of a bearing to fail to act freely, such a torque is developed. Thereupon, there is a resultant and undesirable wandering of the gyroscope, which in some apparatus it is needful to discover and correct.

Figure 1:
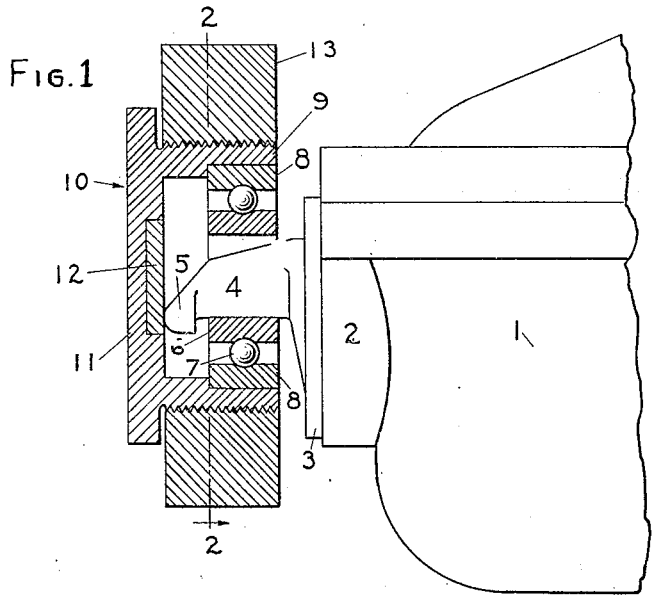
Figure 2:
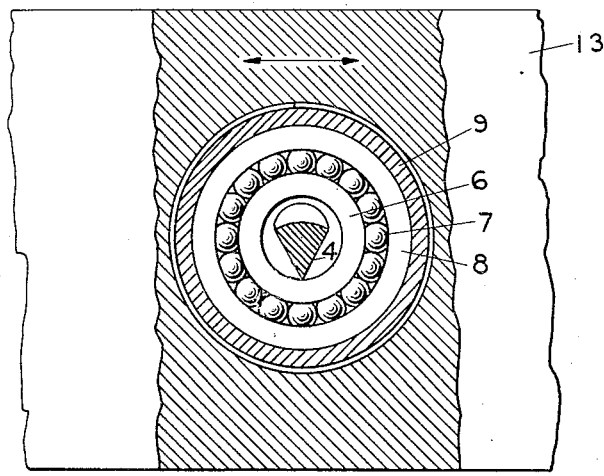

Having revealed the peculiar usefulness of the bearing herein disclosed, reference is now had to the drawing illustrating it, wherein Fig. 1 is a vertical section through the bearing, as it is mounted to support one side of a gyroscope; and Fig. 2 is a vertical section taken on the line 2—2, of Fig. 1.

In the drawing, 1 indicates a portion of a gyroscope, which has a casing provided with a boss 2, to which is affixed the attachment flange 3 of a knife-edge. Projecting outwardly from the flange 3 is the V-shaped knife-edge proper 4, which, as shown in Fig. 2, has a cross section the sides of which form an acute angle. Beyond the V-shaped portion 4, the knife-edge is provided with a substantially hemi-spherical impingement head 5, which, as shown later, plays a part in taking care of the end thrusts of the trunnion of the gyroscope, or other supported body, which trunnion, in the present instance, is the knife-edge member.

That portion of the knife-edge member which is of substantially triangular cross section extends through the bore of the inner race 6 of an annular ball bearing, its edge resting on top of the bottom portion of that race. An annular row of balls 7 is interposed between the inner and outer races 6 and 8 in any approved manner, and may, if desired, be held in a ball-retainer in the well-known way.

As advisable, the outer race 8 may be held either directly in a support or in a retainer adapted to be fitted into a support. In the illustrated form of the invention, the race 8 is fitted into the cylindrical barrel 9 of a bearing retainer 10, which has an end wall 11 in a recess in the inner face of which is a retentively held thrust bearing member 12. Such member may partake of a form suitable to the requirements of the mounting, and may be a hardened steel block or a jewel. The hemi-spherical impingement head 5 of the knife-edge 4 is opposed to and co-acts with the thrust block 12, the contacting point of head 5 being collinear with the contacting edge of the knife-edge member 4, whereby the block 12 receives the end thrusts of the knife-edge 4 whenever the supported body is urged longitudinally thereof toward such block.

The cylindrical barrel 9 of the bearing retainer 10 is shown to be threaded and screwed into a support 13 permitting its inward or outward adjustment, thus relating the thrust block 12 to the impingement head 5 of the knife-edge 4, and so regulating the end play thereof and the movement of the supported body in that direction.

In its operation, the improved bearing supports its load with the knife-edge 4 normally resting on the lowermost part of the interior cylindrical surface forming the bore of the inner race 6. Any disturbance causing a relative displacement in a horizontal direction of the supported body 1 and the support 13 will effect a rocking of the knife-edge 4, and due to the absence of a vertex in the cylindrical surface of the bore of the inner race 6 there can be no binding restraint placed upon the knife-edge as it rocks.

Since the inner race 6 is sensitively mounted on the balls 7 that run freely in the outer race 8, the knife-edge 4 resting on the inner race 6 always seeks the bottom of the bore of the latter race. In consequence of the load on the knife-edge, the latter will obviously tend to remain in position to rock about a predetermined axis of oscillation.

In some instances, in order to maintain great freedom at the bearings the support is agitated. As an example, when the gyroscope 1 is mounted in a gimbal ring, which may constitute the support 13, the gimbal ring may be oscillated about a vertical axis, as indicated by the double headed arrow in Fig. 2. The resultant shaking is counted upon to prevent any sticking between the parts of the bearings, and in my improved bearing, the load applied through the knife-edge 4 to the inner race 6 will affect the latter so that gravity will always cause the line of contact of the knife-edge 4 with the surface of the bore of the inner race 6 to seek the lowest position possible within the bore. Whether the support 13 is an oscillatory gimbal ring or simply a stationary bearing, the bearing herein disclosed is supersensitive and furnishes as great a degree of freedom as it is probable will ever be desired in even the most delicately operable instruments or mechanisms.

It will, of course, be understood that the invention is not restricted in any way to the illustrated embodiment thereof, but may be practiced in accordance with the dictates of the requirements of any particular mechanism in which it may be employed. Therefore, it is obvious that the details and form of the anti-friction bearing disclosed herein may be altered without departing from the spirit of the invention, upon which no limitation is intended to be placed, except as imposed by the appended claims.

What I claim is:—

1. The combination with a body to be supported and a supporting element, of a hollow bearing retainer mounted in the supporting element for inward and outward adjustment and having a closed end with a hard inner surface, an anti-friction bearing comprising an outer race rigidly mounted in said retainer, an inner race and rolling members between said inner and outer races, and a trunnion projecting from the body and extending through and beyond the inner race, said trunnion being formed as a knife-edge resting on the inner race and having a substantially hemi-spherical end to engage said hard inner surface of the retainer, the line of contact of the knife-edge and the point of contact of said hemi-spherical trunnion end being collinear.

2. The combination with a body to be supported and a supporting element, of a hollow bearing retainer mounted for inward and outward adjustment in the supporting element and having a closed end, a hard surfaced member on the inner side of the closed end fast therewith, an anti-friction bearing comprising an outer race mounted in and rigid with said retainer, an inner race and rolling members between said races supporting the inner race from the outer race, and a trunnion projecting from the body and extending through and beyond the inner race, said trunnion being formed as a knife-edge resting on the inner race and having its end formed as a substantially hemi-spherical head for engaging said hard surfaced member, the line of contact of the knife-edge and the point of contact of said head being collinear, said head being positioned to be normally spaced from but to overlap a side of the inner race.

3. The combination with a body to be supported and a supporting element, of an anti-friction bearing comprising inner and outer races and interposed friction-reducing rolling members, a bearing retainer mounted on the supporting element and having the outer of said races rigidly combined with it, a thrust-resisting element carried by and rigid with said retainer, and a knife-edge combined with the body, resting upon said inner race and provided with a head adapted to bear against said thrust-resisting element.

4. The combination with a body to be supported on a supporting member therefor, of an anti-friction bearing, a container therefor in which said bearing is held against displacement longitudinally of its axis of rotation, a knife-edged trunnion resting on said anti-friction bearing and extending from said body, and a bearing surface in effect constituting a rigid portion of said container for engaging the end of said trunnion the place of engagement therebetween being collinear with the line of contact of the knife-edge thereof, said container being movably mounted in said member whereby said bearings are jointly adjustable co-axially with respect to said trunnion.

In testimony whereof I affix my signature.

HARRY L. TANNER.